United States Patent
Su et al.

(10) Patent No.: US 7,315,953 B2
(45) Date of Patent: Jan. 1, 2008

(54) APPARATUS AND RELATED METHOD OF COORDINATING NORTH BRIDGE AND SOUTH BRIDGE FOR PROCESSING BUS MASTER REQUESTS OF PERIPHERAL DEVICES FOR CONTROLLING A CENTRAL PROCESSING UNIT TO OPERATE IN A POWER-SAVING STATE

(75) Inventors: Yao-Chun Su, Taipei Hsien (TW); Ruei-Ling Lin, Taipei Hsien (TW); Jui-Ming Wei, Taipei Hsien (TW); Cheng-Wei Huang, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 190 days.

(21) Appl. No.: 10/908,821

(22) Filed: May 27, 2005

(65) Prior Publication Data

US 2006/0053310 A1    Mar. 9, 2006

(30) Foreign Application Priority Data

Sep. 7, 2004    (TW) .............................. 93127070 A (51) Int. Cl.
*G06F 1/32* (2006.01)
(52) U.S. Cl. ....................................... 713/320; 713/323
(58) Field of Classification Search ................. 713/320
See application file for complete search history.

(56) References Cited

U.S. PATENT DOCUMENTS

| | | | | | |
|---|---|---|---|---|---|
| 6,065,122 | A | * | 5/2000 | Wunderlich et al. | 713/320 |
| 6,085,330 | A | * | 7/2000 | Hewitt et al. | 713/322 |
| 6,243,817 | B1 | * | 6/2001 | Melo et al. | 713/300 |
| 6,311,281 | B1 | * | 10/2001 | Pole et al. | 713/322 |
| 6,378,076 | B1 | * | 4/2002 | Qureshi | 713/322 |
| 7,017,054 | B2 | * | 3/2006 | Schuckle et al. | 713/300 |
| 2005/0039063 | A1 | * | 2/2005 | Hsu et al. | 713/324 |

* cited by examiner

*Primary Examiner*—Chun Cao
(74) *Attorney, Agent, or Firm*—Winston Hsu (57) ABSTRACT

A connected indicator wire of open-drained configuration is set between a north bridge and a south bridge. When either the south or north bridge is handling a bus master request, a bus master indicator (BMI) signal is asserted to the connected indicator wire. With open-drained configuration, the signal of the connected indicator wire is capable of reflecting whether a BMI signal is asserted, and accordingly, the south bridge controls the CPU to switch between power saving states for responding to the bus master request. The CPU does not have to resume a full-function power state to coordinate a bus master service.

20 Claims, 5 Drawing Sheets

APPARATUS AND RELATED METHOD OF COORDINATING NORTH BRIDGE AND SOUTH BRIDGE FOR PROCESSING BUS MASTER REQUESTS OF PERIPHERAL DEVICES FOR CONTROLLING A CENTRAL PROCESSING UNIT TO OPERATE IN A POWER-SAVING STATE

BACKGROUND OF INVENTION

1. Field of the Invention

The invention relates to an apparatus and a related method of coordinating a north bridge and a south bridge for controlling power saving state transition of a central processing unit, more particularly, to an apparatus and a related method for a connected indicator wire of an open-drain configuration set between the north bridge and the south bridge for coordinating a central processing unit in switching C2/C3 power saving states to support a bus master service.

2. Description of the Prior Art

A computer system is one of the important pieces of hardware in modern information era. Modern computer systems improve efficiency and also reduce power consumption. Thus manufacturers of this field tend to reduce power consumption and regard power issues as an important research and development topic.

In the computer system, the central processing unit controls management and operation of data and figures. The north bridge and the south bridge form a chipset responsible for managing data exchange between the central processing unit and other peripheral devices. For example, through a bus, the north bridge is coupled to a system memory and display accelerated graphics card, and the south bridge is coupled to peripheral devices such as a hard disk, optical disc drive, keyboard, mouse, etc. As the central processing unit controls the entire operation of the computer system, in order to reduce its power consumption, the modern central processing unit is capable of functioning at different states for power saving. Those skilled in the art will recognize that the modern computer processing unit operates at states C0, C1, C2, C3, C4 and C5 from a low to high state of power saving. At state C0 where the consumption is highest, the central processing unit exploits its full capability in operation and control, and is capable of receiving and transmitting all commands, signals and timing. In the higher state C1, the central processing unit enters a halt state and stops sending commands. The central processing unit here does not operate with the full capability as it does in state C0, thus requires less power consumption. In comparison, in the higher state C2, the central processing unit stops executing commands, only maintains an operating phase-locked loop (PLL), content recorded in cache of the central processing unit is also maintained. In another words, under the state C2, the central processing unit has less functional circuits than C1, but has a lower power consumption than C1.

Likewise, in state C3, the central processing unit stops the operation of the phase-locked loop in order to save more power; under the state C3, the power consumption of the central processing unit has decreased to ⅕~ 1/10 of state C1 power consumption. When the central processing unit enters state C4 or C5, the central processing unit has even less power consumption and fewer functional circuits.

The higher the power saving state the central processing unit enters, the lower the power consumption, however, in order to allow the computer system to function properly, the central processing unit first needs to switch the power saving states in order to support certain functions. For example, when the peripheral devices of the north bridge and the south bridge need to access data stored in the system memory, they can request the south bridge to directly access memory through the north bridge, this is known as a bus master. In processing the bus master for the peripheral device, the north bridge and the south bridge manage the exchange of data between the peripheral device and system memory, and also the north bridge performs a snoop operation onto the central processing unit (to check whether the cache has this same data), to ensure the data in the cache and the system memory is the same. As known by those skilled in the art, when the central processing unit is executing a program and managing the data, the data needed is loaded from the system memory to the cache in the central processing unit. This is to accelerate accessing speed of data. However, when the central processing unit updates the data in the cache, the corresponding data in the system memory is not updated immediately. At this time, if a peripheral device transmits a bus master to directly access the system memory, the old data (not updated data) will be accessed. To avoid fetching the old data, during a bus master request of the peripheral device, the north bridge provides a snoop operation service to check if there is a copy or modified data in the cache to ensure that the data accessed by the peripheral device has the correct content. In order to support the snoop operation by the north bridge in the above-mentioned scenario, whenever there is a bus master request by the peripheral device, the central processing unit has to operate at or below state C2. If the central processing unit operates at state C3 or higher power saving states, then the north bridge cannot support the snoop operation service.

In the prior art, in order to support the related bus master request, the central processing unit needs to refresh at state C0, as described in the following. At state C3, a bus master requested by the peripheral device is transmitted to the south bridge, the north bridge sets the control signals, sequentially, STPCLK# (# means the opposition of STPCLK) and SLP# to change from 0 to 1. In this way, the central processing unit switches from state C3 to fully operational state C0. At state C0, the central processing unit is capable of changing contents of a register, and a register IO22 (or ARB_DIS) of the south bridge switches from 1 to 0, which ensures that the north bridge switches from state C3 to state C2 and below so that the snoop service can be performed, also means the north bridge and the central processing unit are capable of performing the snoop service. After register IO22 is changed, the south bridge can begin managing the bus master of the peripheral device and the snoop operation can be provided by the north bridge.

There is a drawback in the above-mentioned prior art, namely, the central processing unit is unable to reduce power consumption. Actually, the central processing unit can support snooping of the north bridge at state C2. However, in the prior art mentioned above, since the central processing unit can change the status of the register IO22 only at state C0, the central processing unit has to be switched to state C0. Except changing the register IO22, the bus master request of the peripheral device only involves the north bridge and the south bridge, not the central processing unit. Therefore in the above-mentioned the prior art of switching to state C0 in the central processor unit actually causes unnecessary high consumption of power.

SUMMARY OF INVENTION

The main objective of the claimed invention is to coordinate the north bridge and the south bridge to service the bus master request of a circuit and related devices by a connected indicator wire. This includes resuming state C2 to support the bus master request and overcoming the drawback of increased power consumption when the central processing unit switches to state C0.

According to a preferred embodiment of the claimed invention, a connected indicator wire is installed between the north bridge and the south bridge in an open-drained configuration. The north bridge and the south bridge can assert a bus master indicating signal (BMI) to the connected indicator wire even during servicing the bus master request. The open-drained configuration allows simultaneously driving the connected indicator wire by the north bridge and the south bridge. Then the south bridge can determine whether the north bridge has completed a snoop operation according to the indicating signal of the connected indicator wire. On the other hand, the north bridge can also determine whether the south bridge has a new bus master request. While the south bridge is coordinating a bus master request, the central processing unit operates at state C2, and there is no need to switch to state C0 to change the status of signal IO22. Thus the claimed invention can reduce the power consumption of the central processing unit during the bus master request operation.

The following describes the process of servicing the bus master request by the north bridge and the south bridge. When the central processing unit operates at state C3, if a request is made by the peripheral device of the south bridge to access the system memory, the south bridge switches a control signal SLP# from logic 0 to 1 and the central processing unit switches back into state C2. The connected indicator wire transmits an indicating signal to ensure that the north bridge is maintained at state C2 or above in order to support the snoop operation. When the north bridge performs the snoop operation, the south bridge prompts the north bridge by a signal UPCMD to begin the snoop service for the peripheral device. During the period of providing the snoop service and performing a bus master request, the north bridge continuously transmits the indicating signal through the connected indicator wire. If the peripheral device writes data into the system memory, the south bridge transmits the peripheral device data to the north bridge, then stopping the indicating signal transmission. At this time, the indicating signal transmitted by the north bridge enables the signal of the connected indicator wire to maintain connection with the north bridge to perform a related operation of the bus master request. When all the bus master request services are completed, the north bridge stops transmitting the indicating. That is, both the north bridge and the south bridge will stop transmitting the indicator signal when the bus master request services are completed. Herewith, the south bridge returns the central processing unit status back to state C3.

Looking at another aspect, if the peripheral device reads the data of the system memory, the north bridge completes the snoop operation and transmits the data of the system memory to the south bridge. The south bridge then transmits the same data to the peripheral device and stops asserting the indicating signal transmission. The signal of the connected indicator wire changes to show that both the north bridge and the south bridge have stopped asserting the indicator signal when the bus master request services are completed. Herewith, the south bridge returns the computer processing unit status back to state C3.

In the claimed invention, the north bridge and the south bridge coordinate through the connected indicator wire to process the bus master request of the peripheral device. In serving the bus master request, the central processing unit does not need to return to state C0 to change the state of the register IO22, it only needs to return to state C2 to support the snooping operation of the north bridge. Hence the claimed invention is capable of improving power saving of the central processing unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
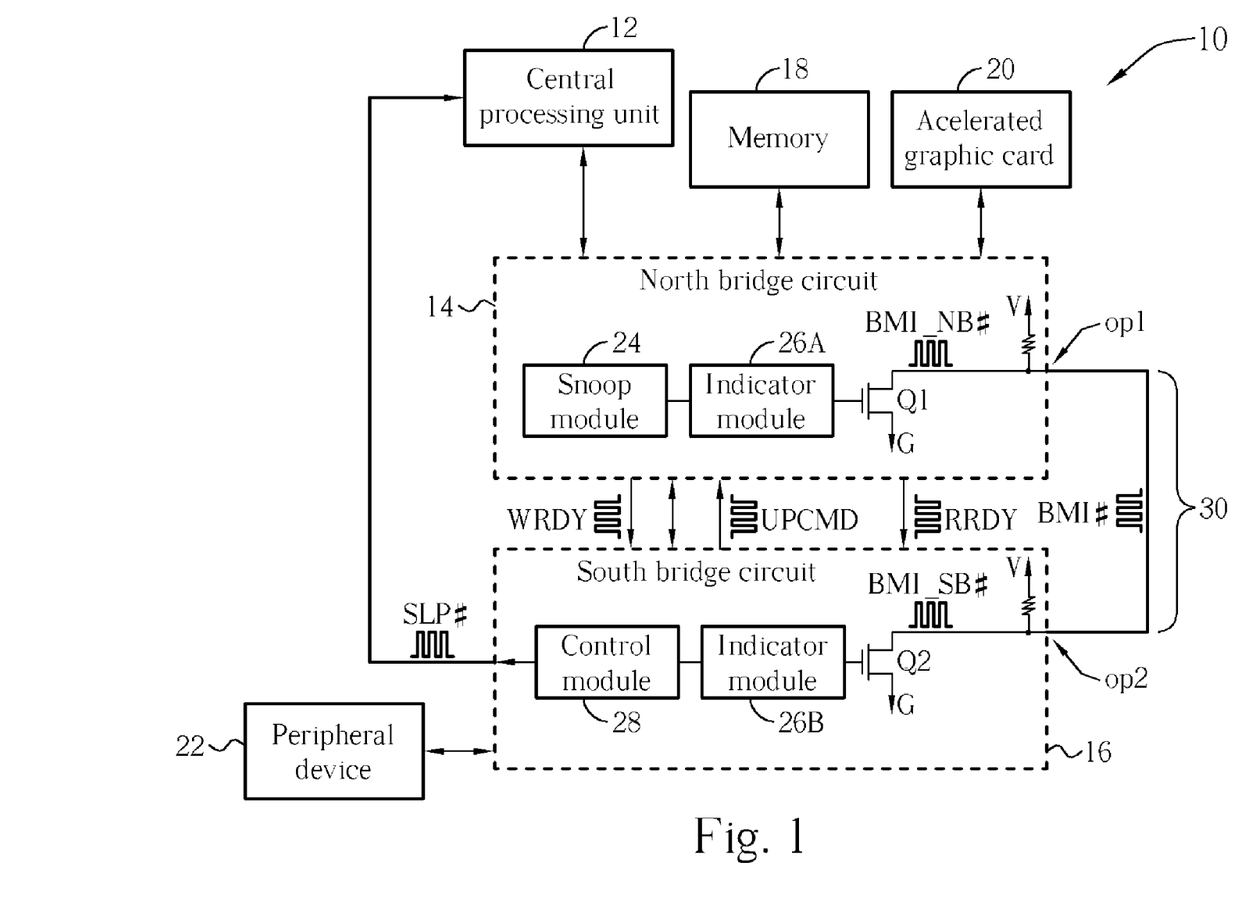
FIG. 1 is a functional block diagram of a computer system according to the present invention.

Please refer to FIG. 1. FIG. 1 is a functional block diagram of a computer system 10 according the present invention. The computer system 10 comprises a computer processing unit 12 for controlling information management and data operation of the computer system 10; a north bridge 14 and a south bridge 16 integrated in a chipset for managing data exchange between the central processing unit 12, memory, and peripheral devices; a memory 18 (for example a dynamic random access memory); an accelerated graphics card 20 as part of the peripheral device of the north bridge 14 for managing graphical data to allow operation of the computer system to be displayed in graphics and images; and a peripheral device 22, to which the south bridge 16 can couple. The peripheral device 22 can be a hard-disk, a CD-Rom, all types of interface cards (such as sound card or network card) or input devices like a keyboard and mouse.

The north bridge 14 comprises a snoop module 24 and an indicator module 26A, and the south bridge 16 comprises a control module 28 and an indicator module 26B. In one embodiment, a connected indicator wire of an open-drained circuit 30 is coupled in between the north bridge 14 and the south bridge 16. In FIG. 1, the indicator module 26A of the north bridge 14 couples to the connected indicator wire 30 through an open-drained circuit, for example a gate and a drain of transistor Q1 (which can be a metal oxide semiconductor transistor, within a first signal port (IO pad) op1). Similarly, the indicator module 26B of the south bridge 16 also couples to the connected indicator wire 30 through another gate and drain of transistor Q2, within a second signal port op2 (where V and G indicate bias voltage). When the north bridge 14 is performing a related service of the bus master, the indicator module 26A of the north bridge activates the drain of the transistor Q1, and the connected indicator wire 30 asserts a logic (i.e. level, binary value) 0 of the north bridge indicating signal BMI_NB# (# means the revert of BMI_NB). Similarly, when the south bridge is performing a related service of the bus master, the indicator module 26B of the south bridge activates the drain of the transistor Q2 to assert a logic 0 of the south bridge indicating signal BMI_SB# on the connected indicator wire 30. In the open drain circuit, the signal of connected indicator wire 30 BMI# is equivalent to a result of a logic operation of the indicating signals BMI_SB# and BMI_NB# (for example an OR operation). Then the signal BMI# can reflect whether the indicator module 26A or 26B of the north bridge and the south bridge has asserted the corresponding indicating signal (which is BMI_SB# or BMI_NB#). Thus the signal BMI# can act like a state adjustment signal. In this way, the north bridge and the south bridge can inter-coordinate through the connected indicator wire 30. For example, the north bridge performs a state change (for example from state C3 to C2), and the central processing unit does not need to return to state C0 to change the status of the register IO22. The north bridge and the south bridge can utilize an internal mechanism such that the content of the register IO22 will not affect the bus master request, i.e., the content of the register IO22 is not referred during bus master request. Hence, the north bridge can continue to perform the snooping operation, and the control module 28 of the south bridge 16 can control the state of the central processing unit 12 (for example, to return to state C2) by using signal SLP# and STPCLK# (not shown) according to the signal BMI#. When the signal BMI# of the connected indicator wire 30 shows that neither the north bridge nor the south bridge assert corresponding indicating signal, the control module 28 will put the central processing unit into state C3. When the connected indicator wire 30 shows an indicating signal asserted by either the north bridge or the south bridge (or both), the control module switches the central processing unit 12 to state C2. Also when the north bridge is performing a related service of the bus master, the snoop module 24 then can snoop the central processing unit 12 at state C2.

Figure 2:
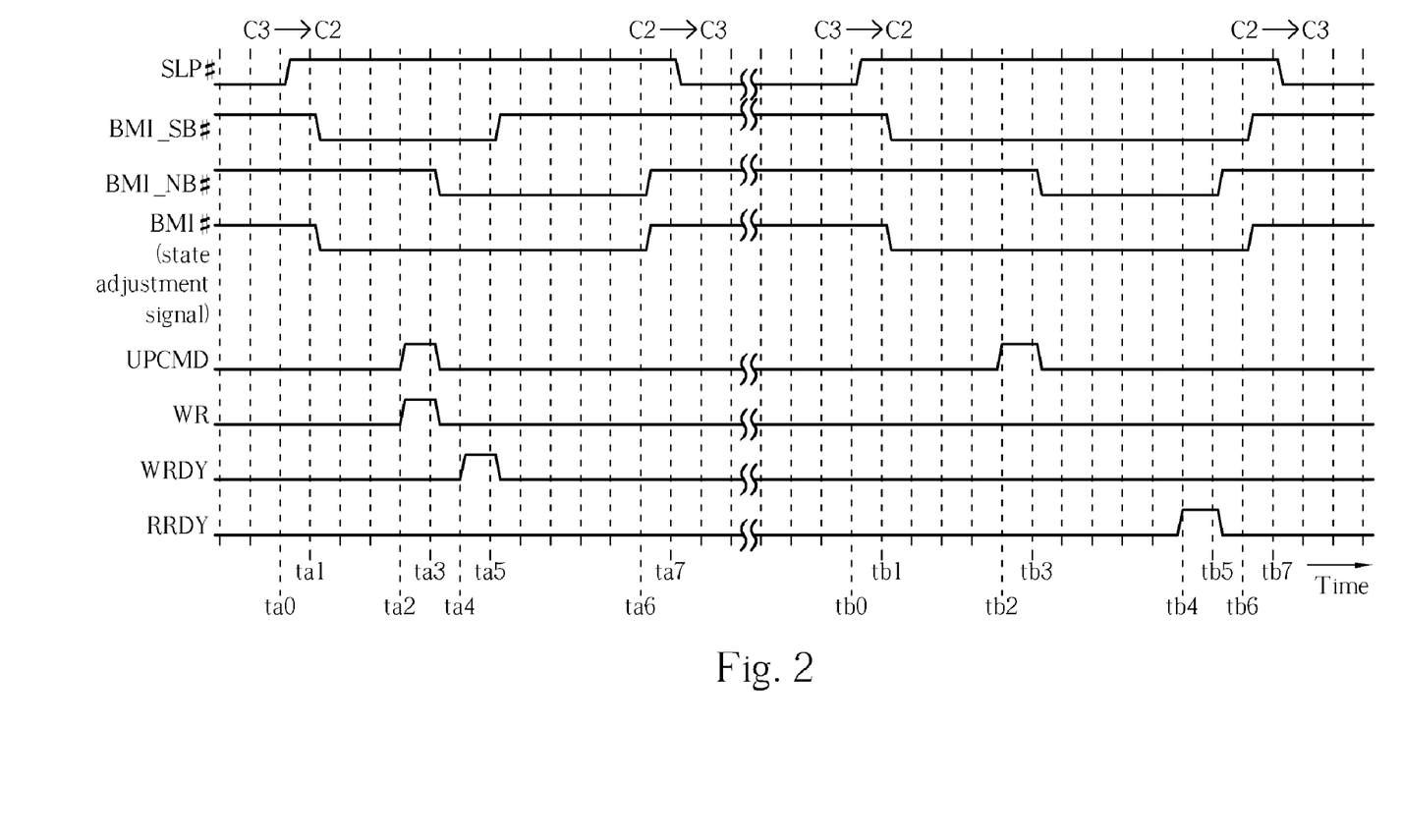
FIG. 2 and FIG. 4 are timing diagrams of sequential signal waveforms according to operation of the computer system of FIG. 1

For further explanation, please refer to FIG. 2 (also FIG. 1). FIG. 2 is a timing diagram of each sequential signal waveform according to operation of the computer system 10 of FIG. 1. The horizontal axis in FIG. 2 represents time. Before time ta0, the central processing unit 12 is resting at state C3. At time ta0, the peripheral device 22 requests a bus master to write data into the memory 18. In order to perform a bus master, after time ta0, the control module 28 of the south bridge 16 switches the signal SLP# from 0 to 1, hence switching the central processing unit 12 from state C3 to C2 at time ta0 to support snooping of the north bridge. At time ta1, the indicator module 26B of the south bridge 16 activates the transistor Q2 to assert the south bridge indicating signal BMI_SB# on the connected indicator wire (here logic 0 for example uses Vcc voltage and logic 1 correspondingly uses the ground voltage (GND)). The signal BMI# of the open-drain of the connected indicator wire switches to logic 0 as well, reflecting that the bridge has asserted an indicating signal. At the same time ta1, after receiving the indicating signal BMI_SB# of the south bridge through the connected indicator wire 30, the north bridge 14 goes into a power saving state (like state C2), therefore the internal phase-locked loop recovers operation to provide the snooping operation service. Also, the north bridge can provide a particular signal (not shown in FIG. 1) to notify the south bridge 16 that the north bridge needs to start a new phase-locked loop in order to provide a service. Then the south bridge will wait a longer delay until the north bridge 14 is able to service a bus master situation. Looking at another scenario, the north bridge 14 may have been ready for service at time ta0 with its phase-locked loop already being functioning. Then the south bridge only waits a shorter delay until the north bridge 14 is able to service a bus master situation.

Either way, at time ta2, the north bridge 14 is capable of providing related services of the bus master (such as the snoop service, data transmission, etc.), and the south bridge 16 notifies the north bridge 14, by transmitting a logic 1 signal UPCMD, to service a bus master request and transmits the data of the peripheral device 22 to be written in the memory 18 to the north bridge 14. In FIG. 2, a signal WR has a level of logic 1, which represents time duration of data transmission. At time ta3, the north bridge 14 also asserts an indicating signal BMI_NB# of the north bridge through the connected indicator wire, which represents that the north bridge is able to service a bus master request. After the data is transmitted to the north bridge 14, the south bridge 16, at time ta4, transmits logic 1 signal WRDY that represents transmission is completed. At time ta5, the indicating signal of the south bridge stops asserting of the indicating signal. At this time point, in servicing a bus master request operation, the south bridge has completed its own task. As shown in FIG. 2, at time ta5, the north bridge 14 has not completed the service of the bus master request, so the north bridge maintains asserting of indicating signal BMI_NB# and the signal BMI# of the connected indicator wire 30 will remain logic 0. At time ta6, the north bridge 14 completes the service of the bus master request (including writing data into the memory 18 and snooping, etc.), and the indicating signal BMI_NB# is de-asserted and returns back to logic 1. As the north bridge and the south bridge stop asserting the indicating signal, the signal BMI# of the connected indicator wire returns to logic 1. According to transition of the signal BMI# at time ta6, the control module 28 of the south bridge 16 switches the signal SLP# from logic 1 to 0 and the central processing unit 12 from state C2 to C3. This completes the writing service of the bus master request of the north bridge and the south bridge.

Also, for example, at time tb0, the peripheral device of the south bridge requests a bus master of "read" for reading data of the memory 18 into the peripheral device 22. At time tb0, the south bridge 16 switches the signal SLP# from logic 0 to logic 1 again, and the central processing unit switches from state C3 to state C2 to support snooping of the north bridge 14. At time tb1, the south bridge 16 begins to assert the south bridge indicating signal BMI_SB# through the connected indicator wire 30, which means that the south bridge has begun to service a bus master request. Similar to the operation between time ta1 and ta2, the north bridge 14 begins to service at time tb1, and the south bridge 16 can determine how long it should wait before the north bridge returns to the service state through the particular signal of the north bridge. The north bridge 14 will notify the south bridge 16 after returning to the service state.

At time tb2, the north bridge 14 has already returned to the service state, and the south bridge 16 transmits logic 1 of the signal UPCMD between time tb2 and tb3 to notify the north bridge 14 to begin to service a bus master request. At time tb3, the north bridge 14 begins to service the bus master request, such as snooping, and reading the data of memory 18 and transmitting it to the south bridge 16. In performing these operations, the north bridge 14 continues asserting the north bridge indicating signal BMI_NB# of logic 0. At time tb4, the north bridge 14 transmits a signal RRDY of logic 1 to the south bridge 16 and at time tb5, then the north bridge 14 stops asserting the signal indicator BMI_NB#, which means the north bridge 14 has completed servicing the bus master request. The south bridge 16 needs to transmit data from the north bridge 14 to the peripheral device. The south bridge 16 extends the service of the bus master request to time tb6, and the south bridge indicating signal BMI_SB# of logic 0 asserted by the south bridge will also be extended until time tb6. As both the north bridge 14 and the south bridge 16 stop asserting the indicating signal at times tb5 and tb6, the signal BMI# of the connected indicator wire 30 also switches from logic 0 to 1 at time tb6. According to the transition of the signal BMI# at time tb6, the south bridge 16 is capable of switching the value of the signal SLP# from 1 to 0 at time tb7, and hence, the central processing unit is able to switch from state C2 to C3 to end the service of the bus master request.

Figure 3:
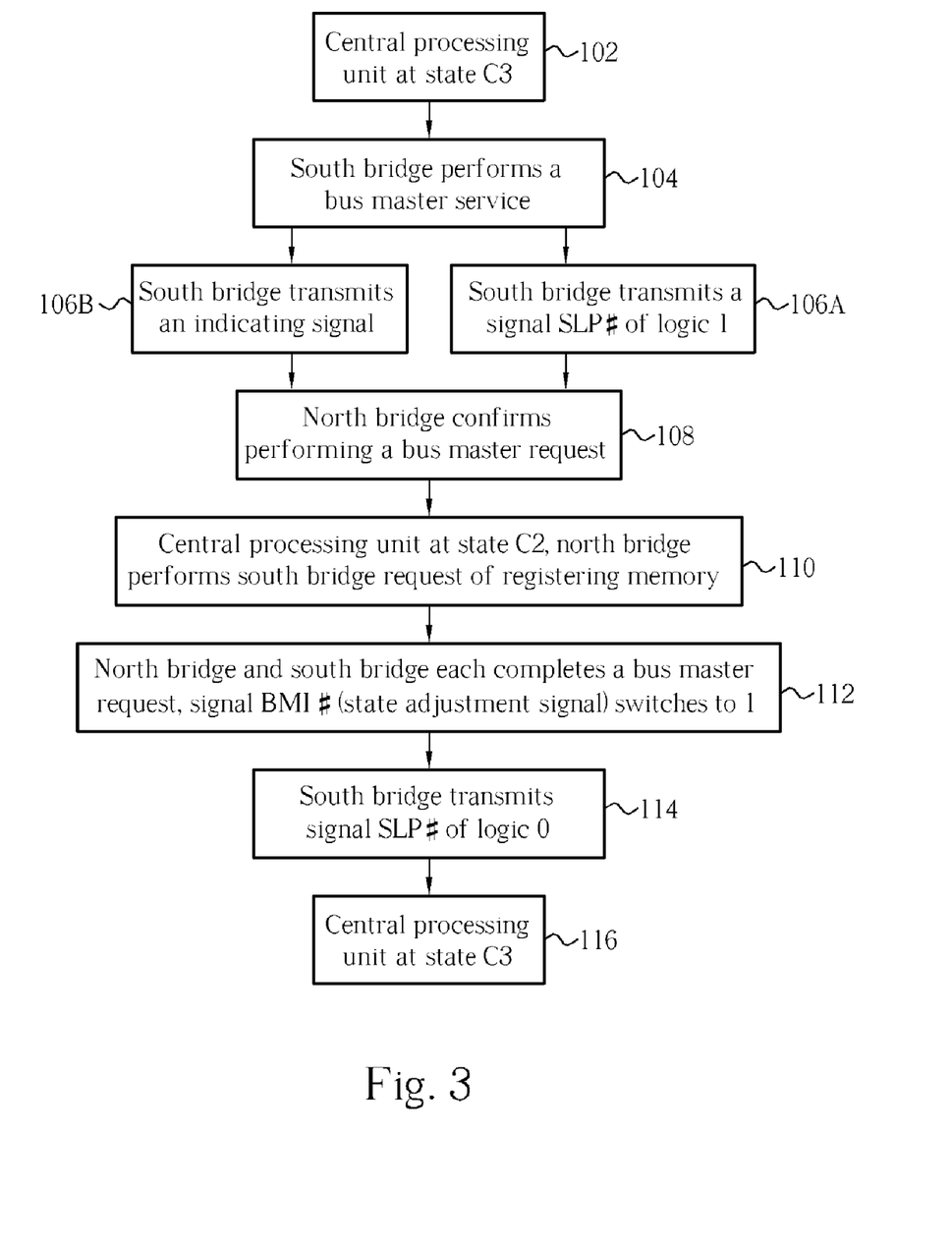
FIG. 3 illustrates a flowchart of operation according to FIG. 2.

Examples of the above-mentioned process can be seen in FIG. 3. Please refer to FIG. 3, which illustrates a flowchart of the chipset of the present invention implementing the south bridge peripheral device to perform the service of the bus master request. The steps are as follows:

Step 102: At the beginning, the central processing unit 12 operates at state C3.

Step 104: The peripheral device of the south bridge performs a bus master request.

Step 106A: To perform a bus master, the south bridge 16 transmits the signal SLP# of logic 1 to switch the central processing unit from state C3 to C2.

Step 106B: The south bridge 16 asserts the south bridge indicating signal BMI_SB# of logic 0, switching the signal BMI# to logic 0, which is equivalent to asserting a signal BMI# of logic 0 on the connected indicator wire 30.

Step 108: According to the signal BMI#, the north bridge 14 prepares to perform the related service of the bus master. As mentioned, the north bridge 14 may need to re-activate its internal phase-locked loop to recover to a state of providing service. The north bridge 14 then notifies the south bridge 16 to perform a bus master service.

Step 110: When the central processing unit 12 continues to operate at state C2, the north bridge 14 performs the operation needed by the bus master request including registering the data of the memory 18 and performing a snooping operation on the central processing unit 12.

Step 112: When the north bridge 14 and the south bridge 16 each completes a bus master needed for operation, both bridges will transmit an indicating signal of logic 1 to de-assert their corresponding indicating signals. Hence the signal BMI# of the connected indicator wire 30 also switches to logic 1.

Step 114: According to step 112, the south bridge 16 again transmits the signal SLP# of logic 0.

Step 116: According to step 114, the central processing unit 12 returns to state C3.

As mentioned above, the present invention is capable of using an open drain configuration connected indicator wire 30 to assist the north bridge and the south bridge to service the bus master request together. There is no need to return the central processing unit 12 to the high power consumption state of C0 to set the register IO22 (ARB_DIS), but only to the lower power consumption state of C2 to support the bus master request of the north bridge 14 and the south bridge 16 in order to reduce power consumption during the process of the bus master request by the central processing unit 12.

Figure 4:
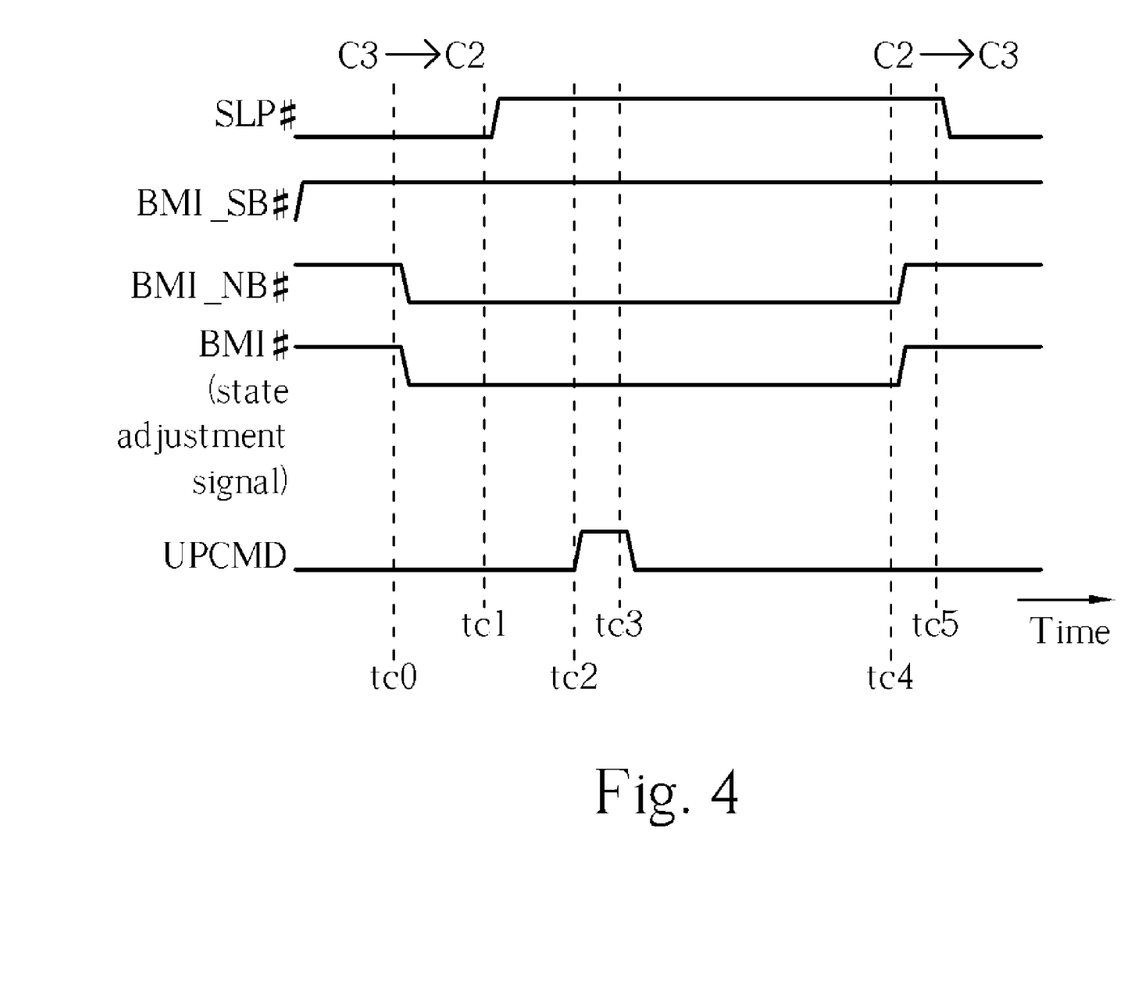

Other than servicing the peripheral device of the south bridge 16, the connected indicator wire 30 of the present invention is also capable of assisting the operation of the north bridge 14 and the south bridge 16 when the peripheral device of the north bridge 14 has a bus master request. In regards to this situation, please refer to FIG. 4 (as the same time refer to FIG. 1). FIG. 4 is a timing diagram of the related sequence of the computer system 10 implementing the bus master request of the peripheral device of the north bridge 14. The horizontal axis of FIG. 4 shows time. The central processing unit 12 remains at state C3 before time tc0. At time tc0, the peripheral device of the north bridge 14 (for example the accelerated graphics card 20) requests for a bus master, and the north bridge will assert the indicating signal BMI_NB# after time tc0. The related signal BMI# of the connected indicator wire 30 switches to logic 0, which means one of the bridges has asserted an indicating signal. Due to the change of the signal BMI#, the south bridge 16 switches the signal SLP# from logic 0 to 1 and hence the central processing unit 12 switches from state C3 to C2, ready to support the snooping operation of the north bridge 14. After the central processing unit 12 switches to state C2, the south bridge 16 will transmit a signal UPCMD of logic 1 to notify the north bridge 14 to begin servicing the bus master request. Between times tc3 and tc4, the north bridge 14 can service bus master requests of other peripheral devices, or perform snooping operations and buffering the data of the memory 18. At time tc4, the north bridge 14 completes servicing and also stops asserting the indicating signal BMI_NB#, and at the same time the signal BMI# returns to logic 1. In accordance to the change in signal BMI#, the south bridge 16 at time tc5 switches the signal SLP# to logic 0, and the central processing unit returns from state C2 back to C3. As the bus master request of the north bridge peripheral device is serviced by the north bridge 14, the south bridge 16 between times tc0 to tc5 does not need to service any bus master request and also does not need to assert the indicator signal BMI_SB#. Since the switch of states in the central processing unit 12 is controlled by the signal SLP# of the south bridge 16, the connected indicator wire 30 of the present invention is also capable of coordinating the operation of the north bridge 14 and the south bridge 16, so there is no need for the central processing unit 12 to return to state C0 in order to support a bus master request.

Figure 5:
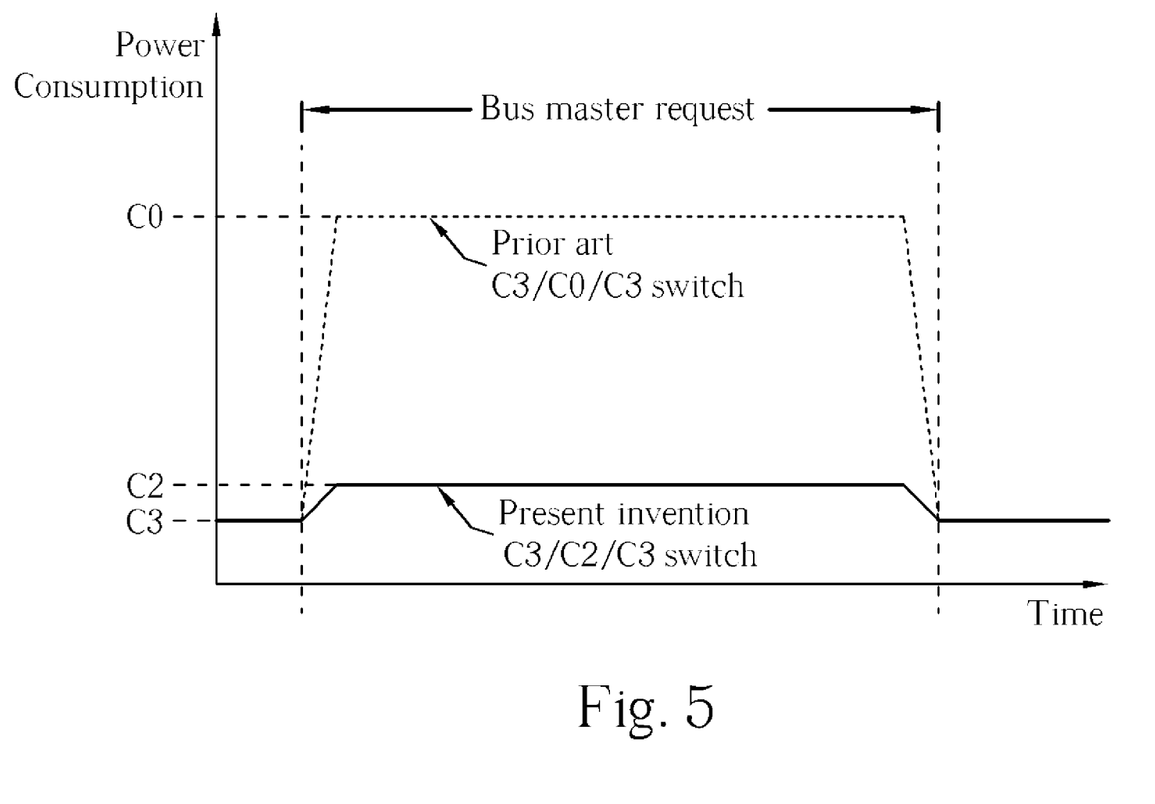
FIG. 5 is a diagram of power consumption of the computer system of FIG. 1.

Please refer to FIG. 5. FIG. 5 is a diagram of power consumption of the computer system 10. The horizontal axis in FIG. 5 illustrates time, and the vertical axis illustrates consumption of power. As shown in FIG. 5, the present invention uses states C3/C2/C3 of the central processing unit to support the chipset in processing a bus master and hence the power consumption is lower. In comparison, the prior art uses states C3/C0/C3 of the central processing unit to process a bus master, greatly increasing power consumption.

In conclusion, one embodiment of the invention is a simple construction of an open-drained connected indicator wire for coordinating the north bridge and the south bridge to service bus master requests of all types of peripheral devices. Thus there is no need for the central processing unit to switch into the high power consumption state C0. When the computer system 10 is servicing the bus master request of a peripheral device, the central processing unit returns to state C2. In comparison to the prior art in state C0, the present invention reduces at least ⅕ to ​⅒ of the power consumption, which also reduces heat generated by the central processing unit. In other type of computer systems (such as a notebook computers) wherein a battery is used for providing electric power to the computer system, if the method of the present invention is used, the duration of the battery will increase. As a matter of fact, in the modern computer system architecture, there are operations that do not need the central processing unit to operate in state C0, such as when the user is listening to music or watching a movie on the computer system, the sound card and the accelerated graphics card alone are capable of executing multi-media files. Hence, the central processing unit can remain at state C3. In the prior art, the central processing unit needs to switch to state C0 in order to process a bus master request, so power consumption will increase if the central processing unit has to switch between states C3 and C0 frequently. The present invention is capable of high power savings. In FIG. 1, the modules of the north bridge 14 and the south bridge 16 can be realized by firmware or hardware. For example, the snoop module 24 and the indicator module 26A of the north bridge 14 can be realized by using the same register routinization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A chipset capable of coordinating a north bridge and a south bridge for power saving, the chipset comprising:
    a north bridge comprising:
        a first signal port;
        a snoop module;
        a first open-drained circuit coupled to the first signal port; and
        a first indicator module coupled to the snoop module and the first open-drained circuit;
    a south bridge comprising:
        a second signal port;
        a control module;
        a second open-drained circuit coupled to the second signal port; and
        a second indicator module coupled to the control module and the second open-drained circuit; and
    a connected indicator wire for performing a logic operation so as to generate a state adjustment signal for controlling operation states of the north bridge and south bridge according to a first indicating signal output from the first signal port and a second indicating signal output from the second signal port.

2. The chipset of claim 1 wherein the first open-drained circuit is a transistor including a gate controlled by the first indicator module, a drain having a first end for receiving a high voltage and a second end coupled to the first signal port, and a source having an end for receiving a low voltage.

3. The chipset of claim 1 wherein the second open-drained circuit is a transistor including a gate controlled by the second indicator module, a drain having a first end for receiving a high voltage and a second end coupled to the first signal port, and a source having an end for receiving a low voltage.

4. The chipset of claim 1 wherein upon receiving a bus master request, the south bridge changes a logic value of the second indicating signal of the second signal port thereby changing the logic value of the state adjustment signal.

5. The chipset of claim 4 wherein the north bridge generates a corresponding operation which switches from a high power-saving state to a low power-saving state when the logic value of the state adjustment signal is changed.

6. The chipset of claim 5 wherein after the north bridge returns to the low power-saving state, the snoop module performs a snoop operation on the central processing unit, and during the snoop operation die first signal port changes the logic value of the first indicating signal.

7. The chipset of claim 4 wherein when the logic value of the second indicating signal changes, the south bridge generates a responding operation causing a central processing unit to switch from a high power-saving state to a low power-saving state.

8. The chipset of claim 1 wherein upon receiving a bus master request, the north bridge changes a logic value of a first indicating signal of the first signal port thereby changing the logic value of the state adjustment signal.

9. The chipset of claim 8 wherein the south bridge generates a corresponding operation which causes the central processing unit to switch from a high power-saving state to a low power-saving state when the logic value of the state adjustment signal is changed.

10. A method of controlling power-saving states of a chipset and a central processing unit, the chipset comprising a north bridge and a south bridge, each coupled to a connected indicator wire, the method comprising:
    determining logic states of a state adjustment signal of the connected indicator wire according to a first indicating signal and a second indicating signal, wherein the state adjustment signal is asserted while one of the first indicating signal and the second indicating signal is asserted or while both of the first indicating signal and the second indicating signal are asserted; and
    performing a corresponding operation by the north bridge and south bridge according to the state adjustment signal of the connected indicator wire;
    wherein the first indicating signal is asserted while the north bridge receives one bus master request, and the second indicating signal is asserted while the south bridge receives one bus master request.

11. The method of claim 10 wherein the central processing unit is capable of operating at a high power-saving state and a low power-saving state, the method further comprising:
    controlling the central processing unit to operate at a high power saving state if the state adjustment signal of the connected indicator wire shows that the north bridge or the south bridge has not output the respective first or second indicator signal; and
    controlling the central processing unit to operate at a low power-saving state if the signal of the connected indicator wire shows the first or second indicating signal.

12. The method of claim 11 further comprising:
    performing a snoop operation on the central processing unit by the north bridge when the central processing unit operates at the low power-saving state; and
    outputting the first indicating signal continuously by the north bridge while the north bridge is performing the snoop operation.

13. The method of claim 10 wherein the south bridge further couples to one or more peripheral devices and the north bridge further couples to a memory, the method further comprising:
    outputting the second indicating signal continuously by the south bridge when the peripheral device is about to write data into the memory: and
    stopping transmission of the second indicating signal by the south bridge after data is sent to the north bridge from the south bridge.

14. The method of claim 13 further comprising:
    outputting the second indicating signal continuously by the south bridge when the peripheral device is about to read data from the memory; and stopping transmission of the second indicating signal by the north bridge after data is transmitted to the south bridge from the north bridge.

15. A computer system comprising:
a central processing unit capable of operating in a high power-saving state and a low power-saving state;
a north bridge comprising a first signal port capable of transmitting a first indicating signal;
a south bridge comprising a second signal port capable of transmitting a second indicating signal;
a connected indicator wire coupled between the first signal port and the second signal port, a signal of the connected indicator wire capable of responding to whether the north bridge or the south bridge has output the respective first or second indicating signal;
the south bridge further comprising a control module; when the signal of the connected indicator wire detects the first or second indicating signal respectively transmitted by the north bridge or the south bridge, the control module is capable of controlling the central processing unit to operate at the low power-saving state.

16. The computer system of claim 15 wherein if the control signal of the connected indicator wire detects no indicating signal transmitted from the north bridge or the south bridge, the control module controls the central processing unit to operate at the high power-saving state.

17. The computer system of claim 15 wherein the north bridge further comprises a snoop module, wherein when the central processing unit operates at the low power-saving state and the snoop module performs a snoop operation on the central processing unit, the north bridge continues to transmit the first indicating signal.

18. The computer system of claim 15 wherein the south bridge further couples to one or more peripheral device, the north bridge further couples to a memory, and an indicator module of the south bridge is capable of transmitting the second indicating signal according to operation of the peripheral device.

19. The computer system of claim 18 wherein when the peripheral device is about to write data into the memory, the indicator module of the south bridge uses the second signal port to continue transmitting the second indicating signal; and after data is sent from the south bridge to the north bridge, the south bridge stops transmitting the second indicating signal.

20. The computer system of claim 18 wherein when the peripheral device reads data of the memory, the indicator module of the south bridge continues to transmit the second indicating signal; after the north bridge transmits data to the south bridge, the north bridge stops transmitting the first indicating signal.

* * * * *